3,541,030
METHOD OF MAKING INORGANIC ION EXCHANGE MEMBRANES
David B. Boies, Chicago, and Paul K. Ase, Evanston, Ill., assignors, by mesne assignments, to the United States of America as represented by the Administrator of the National Aeronautics and Space Administration
No Drawing. Filed Dec. 8, 1966, Ser. No. 600,057
Int. Cl. C08j 1/34
U.S. Cl. 260—2.1                    1 Claim

ABSTRACT OF THE DISCLOSURE

The invention is a new method for making inorganic ion exchange membranes. A polymeric membrane carrier material is dissolved in a solvent and mixed with a soluble salt of thorium or zirconium dissolved in the same solvent. The mixture is deposited on a surface and allowed to dry. The resultant film is immersed in a solution containing a suitable acid or base to both precipitate the thorium or zirconium salt and to leach out previous solvents. Treatment with an acid solution results in a cationic membrane whereas treatment with a basic solution results in an anionic membrane.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a novel method of making inorganic ion exchange membranes, i.e., membranes containing active inorganic ion exchange material, and more particularly relates to such a method wherein the membrane is directly cast in the form of a thin film and the ion exchange material is formed in situ therein. Membranes of both anionic and cationic characteristics may readily and conveniently be fabricated as we teach in the following paragraphs.

In the co-pending patent application of Messrs. Andrew Dravnieks and Jacob I. Bregman entitled "Inorganic for Exchange Membranes," Ser. No. 603,069, filed Oct. 10, 1966 which application is assigned to the assignee of this patent application, there is disclosed and claimed a number of inorganic ion exchange membranes and methods for their fabrication. We have invented a novel method of fabricating such membranes which we believe offers considerable imrovement over the processes taught by Dravnieks and Bregman, and more especially have invented a process whereby the membranes are not only more conveniently and readily made but furthermore are more uniform than those which result from the Dravnieks and Bregman process.

As taught in the referenced co-pending application, a hydrated inorganic ion exchange material is first precipitated from aqueous solution. This is in the form of a gelatinous precipitate that is first washed and then dried to yield a particulate solid. Such solid is preferably then ball milled to produce a fine powder which is then suspended in a binder material after which the suspension is cast into a dry film.

In our new process of forming inorganic ion exchange membranes, the ion exchange material, whether anionic or cationic, is formed in situ in the membrane support material. To accomplish this, we first provide a solution of one of the ion exchange reactants and then mixt herewith a solution of the carrier or binder material. The resulting clear solution is cast as a thin film, dried (i.e., the solvents are removed), and then immersed in an aqueous solution of the other reactant of the ion exchange material. Subsequently, the solvent is leached out and the hydrated active ion exchange material results as a precipitate in the membrane in evenly distributed colloidal form. To carry out our process, there must first be provided solutions of the two ion exchange precursor materials and a solution of the membrane carrier material. Furthermore, it is required that one of the ion exchange solution precursor materials be soluble in the membrane carrier solution. Many solutions, as set out below, can be prepared to meet these requirements.

Accordingly, a primary object of our invention to provide a new and improved method of forming inorganic ion exchange membranes.

A more specific object of our invention is to provide a casting method of forming inorganic ion exchange membranes wherein the active ion exchange material is produced in situ within a carrier framework which subsequently forms the continuous phase of the membranous structure.

These and other objects, features and advantages of our invention will become apparent to those skilled in this art from the following detailed disclosure thereof.

In carrying out our process of making ion exchange membranes, three solutions are required. Two of these solutions contain the inorganic ion exchange precursor materials—the solutes of these two solutions react to form either anionic or cationic materials, depending on the reactants employed, when brought into contact with each other. Accordingly these solutions may be termed "inorganic ion exchange precursor" solutions. The third solution is one containing the carrier precursor material. In forming a membrane with anion exchange properties, one of the ion exchange precursor solutions is alkaline; in forming a membrane with cation exchange properties, instead of using an alkaline solution, an acidic solution is employed. Except for this difference, our process for making either anion or cation exchangers is exactly the same.

The first ion exchange precursor solution, whether the finished membrane is to be cationic or anionic, is a solution of a soluble salt of a metal selected from Groups III, IV, V, VI and VIII of the Periodic Table. Examples of such salts are thorium nitrate and $ZrO(NO_3)_2$—$2H_2O$. When a salt of a Group IV metal is used, it is preferred that such metal be in the tetravalent state.

When making an anionic exchanger membrane, the second solution of the ion exchange precursor, as noted above, is alkaline and we prefer to use an aqueous solution of ammonium hydroxide for this purpose. When a cation exchanger is to be made, an acidic solution is required that contains a polyvalent anion which will form an insoluble acid salt with the metal from the first inorganic ion exchange precursor solution. Although acids derived from the elements of Groups V and VI of the Periodic Table are suitable, we prefer aqueous orthophosphoric acid.

For the carrier material, we prefer to use polyvinylidene fluoride dissolved in dimethyl acetamide although, of course, many similar materials can be employed. An example of other such materials is polyvinyl butyral in solution with ethylene glycol monoethyl ether. The carrier must be non-reactive with the ion exchange precursor materials.

Furthermore, in practicing our process, it is preferred that the carrier precursor solution be first mixed with the soluble salt solution rather than with the acid or base solution as the case may be. Preferably, such acid or base is used as a subsequent treating agent after the initial casting of the film to both precipitate the active ion exchange material and to leach out the remaining solvents which are used in both the first precursor material solution and the carrier solution.

Thus, in the fabrication of an anionic exchange membrane, preferably, we first make a miscible solution of the metal salt precursor and the carrier precursor. This is applied as a thin film on a smooth surface and allowed to air dry. Subsequently the cast film is immersed in an alkaline solution to produce the ion exchange properties. To make a cationic exchange membrane the cast film is treated with an acid solution.

In order that our invention may be more fully understood, reference should next be had to the following examples thereof:

EXAMPLE 1

We first mix 4 parts of a 50% by weight solution of thorium nitrate in dimethyl acetamide with 3 parts of a 20% solution by weight of polyvinylidene fluoride in dimethyl acetamide. The resulting clear solution was cast as a thin film on a smooth surface and allowed to air dry. The film was then immersed in a 10% aqueous ammonium hydroxide solution. In the latter operation, the solvents of the two solutions are leached out and the hydrated thorium oxide is precipitated in the membrane as an evenly distributed colloidal form. There results a membrane having anion exchange properties.

EXAMPLE 2

In order to make a cation exchange membrane, we mix 4 parts of a 50% by weight solution of zirconyl nitrate in dimethyl acetamide with 3 parts of a 20% by weight solution of polyvinylidene fluoride in dimethyl acetamide. The clear solution was cast as a thin film on a smooth surface and then allowed to air dry. It was then immersed in one molar aqueous phosphoric acid to both precipitate zirconyl acid phosphate exchange material and to leach out the solvents for the zirconyl nitrate and the polyvinylidene fluoride.

Acids other than orthophosphoric, which is preferred, may be used. Examples of such other acids are $H_3AsO_4$ and $H_2MoO_4$.

Typical membrane thicknesses which were prepared by our process range from 0.010 to 0.020 inch. The electrical resistance was determined by washing with distilled water to a constant conductivity as measured by pressing platinized platinum electrodes against each side of the wet membrane. Measurements were made at one thousand cycles and gave typical values of 20 to 30 ohm-cm.$^2$, compared to values of 150–350 ohm-cm.$^2$ for membranes prepared in the previous way, i.e. cast from a slurry of powdered hydrous thorium oxide and polyvinyl butyral solution in ethylene glycol monoethyl ether.

It will be apparent to those skilled in this art that a major contribution made by our process over the prior art results from the colloidal nature of the precipitated inorganic ion exchange material with consequent improved properties and the greatly simplified nature of the process. Obviously, a wide variety of compositions can be used, it only being required that a common organic solvent system be found for one of the precursors and the binder.

It will be understood that various modifications and variations may be effected without departing from the spirit or scope of the novel concepts of our invention.

We claim as our invention:

1. A method of making an ion exchange membrane which comprises the steps of:
   (1) mixing solutions having a common solvent of a first ion exchange precursor material comprising a member of the group consisting of thorium nitrate and zirconium nitrate and a polymeric membrane carrier solution that is non-reactive with the ion exchange precursor materials and comprises a member selected from the group consisting of polyvinylidene fluoride dissolved in dimethyl acetamide and polyvinyl butyral dissolved in ethylene glycol monoethyl ether;
   (2) depositing the resulting mixture as a thin film on a surface;
   (3) removing sufficient solvent from the mixture so as to have a thin film integral structure; and
   (4) treating said integral structure with a solution containing a second ion exchange precursor material comprising a member of the group consisting of ammonium hydroxide, phosphoric acid, molybdic acid, and arsenic acid.

References Cited

Hamlen: J. Electrochem. Soc. 109, 746–749 (1962).
Bregman et al.: J. Colloid Sci. 20, 913–922 (1965).

WILLIAM H. SHORT, Primary Examiner

M. GOLDSTEIN, Assistant Examiner

U.S. Cl. X.R.
136—153; 260—2.2